(12) United States Patent
Kinoshita

(10) Patent No.: US 8,952,604 B2
(45) Date of Patent: Feb. 10, 2015

(54) STREAK TUBE AND STREAK DEVICE INCLUDING SAME

(75) Inventor: Katsuyuki Kinoshita, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 0 days.

(21) Appl. No.: 14/354,663

(22) PCT Filed: Aug. 7, 2012

(86) PCT No.: PCT/JP2012/070076
§ 371 (c)(1),
(2), (4) Date: Apr. 28, 2014

(87) PCT Pub. No.: WO2013/065375
PCT Pub. Date: May 10, 2013

(65) Prior Publication Data
US 2014/0292183 A1    Oct. 2, 2014

(30) Foreign Application Priority Data
Oct. 31, 2011   (JP) .................................. 2011-239434

(51) Int. Cl.
G05G 5/00 (2006.01)
H01J 31/00 (2006.01)
H01J 29/46 (2006.01)
H01J 31/42 (2006.01)
H01J 29/62 (2006.01)

(52) U.S. Cl.
CPC ........ *H01J 31/42* (2013.01); *H01J 29/62* (2013.01)
USPC ............................. 313/382; 313/446; 313/413

(58) Field of Classification Search
USPC .................... 313/542, 544, 543, 495–498
See application file for complete search history.

(56) References Cited

U.S. PATENT DOCUMENTS

| 6,765,352 B2* | 7/2004 | Ohtomo et al. ............ 313/542 |
| 7,474,051 B2* | 1/2009 | Sugiyama et al. .......... 313/542 |
| 7,557,503 B2* | 7/2009 | Inagaki et al. ............. 313/530 |

FOREIGN PATENT DOCUMENTS

| JP | S61-250946 A | 11/1986 |
| JP | H04-118530 A | 4/1992 |
| JP | 4-079465 B2 | 12/1992 |
| JP | 2572388 B2 | 1/1997 |

OTHER PUBLICATIONS

English-language translation of International Preliminary Report on Patentability (IPRP) dated May 15, 2014 that issued in WO Patent Application No. PCT/JP2012/070076.

* cited by examiner

*Primary Examiner* — Tracie Y Green
(74) *Attorney, Agent, or Firm* — Drinker Biddle & Reath LLP

(57) ABSTRACT

A steak tube 1 has a container 2 with an entrance plate 2a and an output plate 2b; a photocathode 7 disposed in the container 2 and configured to emit electrons according to light to be measured, the light having been incident through the entrance plate 2a; a mesh electrode 3, a first focusing electrode 4, and an aperture electrode 5 forming an axially symmetric electron lens for focusing the electrons emitted from the photocathode 7, toward the output plate 2b; a sweep electrode 6 disposed in the container 2 and configured to sweep the electrons focused by the axially symmetric electron lens, in a sweep direction along the output plate 2b; and a second focusing electrode 9 disposed between the entrance plate 2a and the output plated 2b and forming a one-dimensional electron lens for focusing the electrons in the sweep direction.

7 Claims, 15 Drawing Sheets

STREAK TUBE AND STREAK DEVICE INCLUDING SAME

TECHNICAL FIELD

The present invention relates to a streak tube for converting a temporal intensity distribution of light to be measured, into a spatial intensity distribution and a streak device including the same.

BACKGROUND ART

The streak tubes have been used heretofore as devices that convert a temporal intensity distribution of light to be measured, into a spatial intensity distribution on an output screen (cf. Patent Literatures 1 and 2 below). A conventional typical streak tube, as shown in FIGS. 8 and 9, has a configuration wherein inside a vacuum airtight container 902 with an entrance window 902a on one end face and an output window 902b on the other end face there are a mesh electrode 903, a focusing electrode 904, an aperture electrode 905, and a sweep electrode 906 arranged along the tube axis in the order named between the entrance window 902a and the output window 902b. A photocathode 907 is disposed on the container-interior-wall-surface side of the entrance window 902a and, a phosphor screen 908 on the container-interior-wall-surface side of the output window 902b.

The mesh electrode 903 has a structure in which a meshed electrode, for example, at the pitch of 1000 meshes/inch is provided at an end of a cylindrical electrode on the photocathode 907 side. The focusing electrode 904 is an axially symmetric cylindrical electrode. The aperture electrode 905 has a structure in which a circular disk having an aperture, for example, with the diameter of several mm is provided at an end of a short cylindrical electrode on the output window 902b side. The sweep electrode 906 is composed of two deflection plates arranged in symmetry with respect to the tube axis. A negative voltage, for example, of −3 kV is applied to the photocathode 907. A positive voltage, for example, of +3 kV is applied to the mesh electrode 903. A high voltage of positive polarity adjusted so as to optimally focus an electron beam on the phosphor screen 908 is applied to the focusing electrode 904. The ground potential (0 V) is applied to the aperture electrode 905 and the phosphor screen 908.

Light is guided from an external device to the streak tube of this configuration to project a linear optical image A through the entrance window 902a onto the photocathode 907 so as to pass through the center of the photocathode 907. The optical image A is projected so as to make an angle of about 45° with the meshes of the mesh electrode 903 and be in parallel with the deflection plates of the sweep electrode 906, in order to avoid appearance of moiré pattern. Then, the photocathode 907 emits an electron beam in a linear distribution along a direction perpendicular to a normal to the photocathode 907, corresponding to the optical image A. The linear electron beam is accelerated by the mesh electrode 903 and thereafter focused by an axially symmetric electron lens formed by a cylindrical electrode system composed of the mesh electrode 903, the focusing electrode 904, and the aperture electrode 905, to pass through the aperture electrode 905, travel through a gap between the deflection plates of the sweep electrode 906, and then impinge on the phosphor screen 908. As a consequence of this operation, a linear optical image B is generated from the output window 902b. On that occasion, in the duration in which the linear electron beam passes between the two deflection plates of the sweep electrode 906, slant sweep voltages varying with time are applied to those deflection plates. This operation results in sweeping the linear electron beam perpendicularly to its line direction and forming an array of linear optical images B arranged in order in the sweep direction on the phosphor screen 908, so as to form so-called streak images. Namely, a luminance distribution corresponding to a temporal change of intensity of the light to be measured is obtained in the sweep direction on the phosphor screen 908. When this is taken by a TV camera and processed by signal processing, we can obtain a temporal intensity profile of the light to be measured.

The linear electron beam is also focused in the direction perpendicular to the sweep direction on the phosphor screen 908 by the axially symmetric electron lens. Therefore, when optical images of multiple channels are arranged in the line direction of the linear optical image A on the photocathode 907, linear optical images B are formed corresponding to the multiple channels on the phosphor screen 908. By sweeping these optical images of multiple channels, we can acquire data of temporal intensity changes about multiple beams of light at the same time and, for example, we can acquire a time-resolved optical spectrum with input of output light from a spectroscope (multi-channel measurement).

CITATION LIST

Patent Literatures

Patent Literature 1: Japanese Patent Application Laid-Open Publication No. S61-250946
Patent Literature 2: Japanese Patent Application Laid-Open Publication No. H4-118530

SUMMARY OF INVENTION

Technical Problem

In the above-described conventional streak tube, for enhancing the time resolution, the voltage of the focusing electrode 904 is adjusted so as to focus the electron beam at the center of the phosphor screen 908. However, as the sweep speed of the sweep voltages applied to the two deflection plates of the sweep electrode 906 becomes higher, a beam spread comes to occur in the sweep direction on the phosphor screen 908, so as to degrade the time resolution.

As a solution to this, it is also conceivable to adjust the voltage of the focusing electrode 904 so as to change in accordance with the sweep speed. However, since the electron lens formed by the focusing electrode 904 was the axially symmetric electron lens, there was a tendency that the optical images spread to blur in the direction perpendicular to the sweep direction being the array direction of multiple channels on the phosphor screen 908 to cause signals to be mixed between adjacent channels, resulting in degradation of accuracy. Furthermore, the change of the voltage of the focusing electrode 904 leads to change in power of the electron lens and, in turn, to change in magnification ratio of the lens, which changes positions of the respective channels on the phosphor screen 908 in the channel array direction. As a result, data processing tended to become complicated in the multi-channel measurement.

Under such circumstances, the present invention has been accomplished in view of the foregoing problem and it is an object of the present invention to provide a streak tube achieving implementation of high-accuracy multi-channel measurement while preventing the blur of the optical images and the variation of the positions of channels in the channel array direction on the output window, and a streak device including the same.

Solution to Problem

In order to solve the above problem, a streak tube according to an aspect of the present invention comprises: a container having an entrance plate and an output plate; a photocathode disposed in the container and configured to emit electrons according to light to be measured, the light having been incident through the entrance plate; an electron focusing system forming an axially symmetric electron lens for focusing the electrons emitted from the photocathode, toward the output plate; a sweep electrode disposed in the container and configured to sweep the electrons focused by the electron focusing system, in a sweep direction along the output plate; and an additional electrode disposed between the entrance plate and the output plate and forming a one-dimensional electron lens for focusing the electrons in the sweep direction.

According to the streak tube of the above aspect, electrons are emitted according to the light be measured, from the photocathode, the electrons are converged by the electron focusing system, and the electrons are guided to the output plate while being swept in the sweep direction along the output plate by the sweep electrode. As a consequence of this operation, an output distribution corresponding to a temporal change of the light to be measured is obtained along the sweep direction. In this operation, the applied voltage to the additional electrode is adjusted in accordance with the magnitude of the sweep speed, which can reduce the blur in the sweep direction of the output distribution to improve the time resolution and which can maintain a good resolution in the spatial direction perpendicular to the sweep direction of the output distribution as well. This prevents the blur of optical images and the variation of channel positions in the channel array direction of the output distribution, and thus achieves implementation of high-accuracy multi-channel measurement.

The streak tube of the above aspect may be configured as follows: the additional electrode has such a configuration that first to third additional electrodes are arranged as spatially separated in this order between the entrance plate and the output plate; the first and third additional electrodes are electrically connected to each other. With this additional electrode, the first and third additional electrodes block an electric field generated by a voltage applied to the second additional electrode, which can prevent an adverse effect on the axially symmetric electron lens formed by the electron focusing system.

The streak tube of the above aspect may be configured as follows: the additional electrode is disposed between the electron focusing system and the sweep electrode; the first and third additional electrodes are electrically connected to an electrode included in the electron focusing system. With this configuration, the first and third additional electrodes surely block the electric field generated by the voltage applied to the second additional electrode, which can more definitely prevent the adverse effect on the axially symmetric electron lens formed by the electron focusing system.

Furthermore, the streak tube of the above aspect may be configured as follows: the additional electrode has a shape with a linear gap formed along a spatial direction perpendicular to the sweep direction along the output plate. In this case, the additional electrode can form the one-dimensional electron lens in the sweep direction.

Still furthermore, the streak tube of the above aspect may be configured as follows: the additional electrode has such a configuration that a linear groove along the spatial direction is formed in a platelike electrode along the output plate. This shape permits the additional electrode to form the one-dimensional electron lens in the sweep direction.

The streak tube of the above aspect may be configured as follows: the additional electrode has such a configuration that two platelike electrodes are arranged opposite to each other along the spatial direction. This shape also permits the additional electrode to form the one-directional electron lens in the sweep direction.

Alternatively, a streak device according to another aspect of the present invention comprises: the above-described streak tube; and a set signal generation unit which sets a voltage value applied to the additional electrode, in synchronism with setting of a slope of a sweep voltage applied to the sweep electrode. This streak device can appropriately focus the electron beam in the sweep direction on the output plate in accordance with a sweep speed of output determined by the slope of the sweep voltage applied to the sweep electrode. This can reduce the blur in the sweep direction of the output distribution in correspondence to various sweep speeds to improve the time resolution and can maintain a good resolution in the spatial direction perpendicular to the sweep direction of the output distribution as well.

Advantageous Effect of Invention

The present invention successfully provides the streak tube achieving implementation of high-accuracy multi-channel measurement while preventing the blur of optical images and the variation of channel positions in the channel array direction on the output window.

DESCRIPTION OF EMBODIMENTS

Preferred embodiments of streak tubes according to the present invention will be described below in detail with reference to the drawings. Identical or equivalent portions will be denoted by the same reference signs in the description of the drawings, without redundant description.

Figure 1:
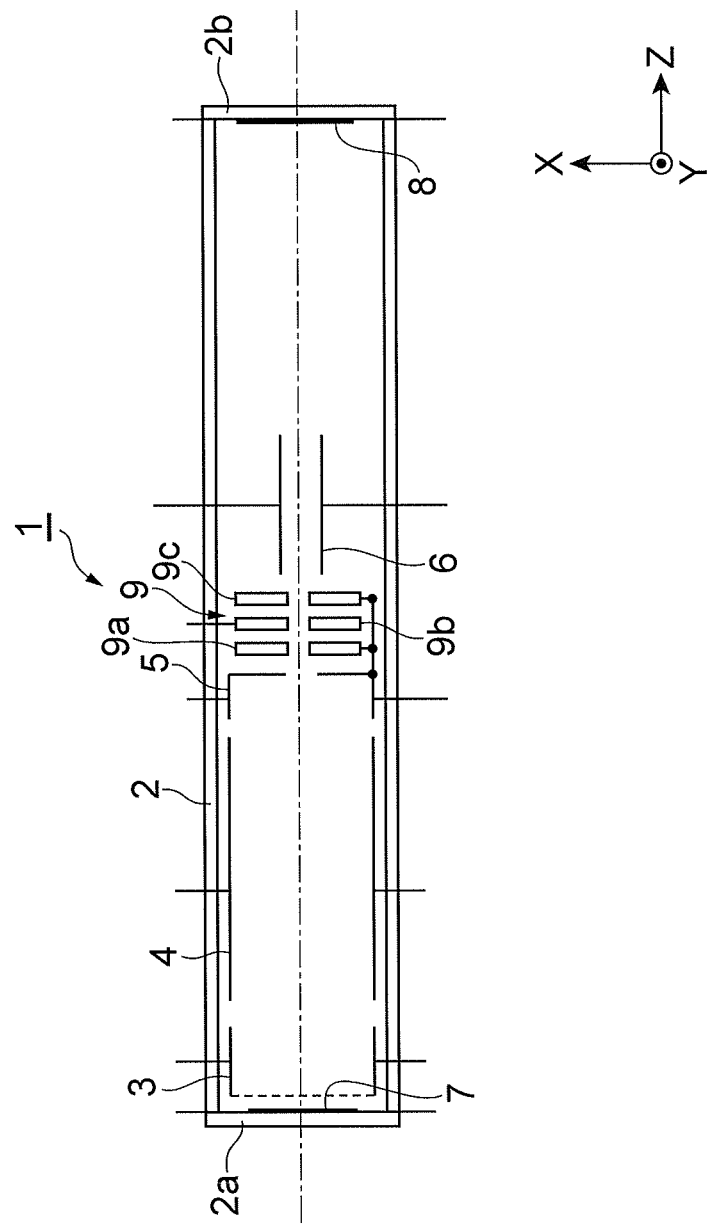
FIG. 1 is a sectional view along a plane perpendicular to deflection plates of a sweep electrode in the streak tube 1 according to a preferred embodiment of the present invention, including its tube axis.

FIG. 1 is a sectional view along a plane perpendicular to the deflection plates of the sweep electrode in the streak tube 1, including its tube axis. The streak tube 1 is a device for obtaining a luminance distribution corresponding to a temporal change of intensity of an optical image. The streak tube 1 has such a configuration that inside a container 2 of a cylindrical shape there are a mesh electrode 3 (electron focusing system), a first focusing electrode (electron focusing system) 4, an aperture electrode (electron focusing system) 5, a second focusing electrode (additional electrode) 9, and a sweep electrode 6 arranged. An entrance plate 2a of an optically transparent material to which light to be measured is guided is fixed to one end face of the container 2. An output plate 2b of an optically transparent material from which an output image is output is fixed to the other end face of the container 2. In the description hereinafter, a direction along the tube axis of the container 2 in FIG. 1 is defined as Z-axis direction, a direction (sweep direction) along the output plate 2b of the container 2 which is perpendicular to the deflection plates of the sweep electrode 6 is defined as X-axis direction, and a direction (spatial direction) along the output plate 2b of the container 2 which is perpendicular to the X-axis is defined as Y-axis direction.

The streak tube 1 has a photocathode 7 formed on an inside face of the entrance plate 2a, and a phosphor screen 8 formed on an inside face of the output plate 2b. The photocathode 7 is a so-called transmission type photocathode that emits electrons toward the output plate 2b, according to the light to be measured, the light having been incident along the tube axis of the container 2 from the outside to the entrance plate 2a. The phosphor screen 8 outputs an output image according to an incident distribution of the electrons to the outside, in response to incidence of the electrons emitted from the photocathode 7.

The mesh electrode 3 is an electrode for acceleration of an electron beam which has such a shape that an end of a cylindrical electrode on the photocathode 7 side is covered by a mesh electrode. The mesh electrode 3 is arranged next to the photocathode 7 inside the container 2 so that a central axis of the cylindrical electrode is approximately coincident with the tube axis of the container 2. The mesh electrode 3 is arranged so that when a linear optical image along the Y-axis direction is incident to the entrance plate 2a, an angle of the optical image with meshes is approximately 45°, i.e., so that the meshes make 45° with respect to the X-axis (the Y-axis). This can prevent a moiré pattern from appearing in the output image. The spacing of the meshes is set, for example, to 1000 meshes/inch.

The first focusing electrode 4 is an axially symmetric cylindrical electrode. The first focusing electrode 4 is arranged next to the mesh electrode 3 inside the container 2 so that a central axis of the cylindrical electrode is approximately coincident with the tube axis of the container 2. The aperture electrode 5 is disposed next to the first focusing electrode 4 on the opposite side to the mesh electrode 3. The aperture electrode 5 has such a configuration that an end of an axially symmetric cylindrical electrode on the phosphor screen 8 side is covered by a circular disk electrode with an aperture (opening) formed in a central region thereof. The aperture electrode 5 is arranged so that a central axis of the cylindrical electrode is approximately coincident with the tube axis of the container 2 and so that the aperture is located on the tube axis of the container 2.

The mesh electrode 3, first focusing electrode 4, and aperture electrode 5 are an electrode group (electron focusing system) of a cylindrical shape that forms an axially symmetric electron lens for focusing the electrons emitted from the photocathode 7, toward the phosphor screen 8. A predetermined negative potential (e.g., −3 kV) is applied to the photocathode 7. A predetermined positive potential (e.g., +3 KV) is applied to the mesh electrode 3. A high voltage of positive polarity is applied to the first focusing electrode 4. The ground potential (0 V) is applied to the aperture electrode 5 and the phosphor screen 8. In this case, two-dimensional electron lenses symmetric with respect to the tube axis of the container 2 to focus the electron beam accelerated in the Z-axis direction by the mesh electrode 3, onto the phosphor screen 8 are formed between the mesh electrode 3 and the first focusing electrode 4 and between the first focusing electrode 4 and the aperture electrode 5. The magnitude of the voltage applied to the first focusing electrode 4 is so adjustable as to optimally focus the electron beam on the phosphor screen 8.

The inner diameter of the cylinders of the mesh electrode 3, first focusing electrode 4, and aperture electrode 5 is, for example, 20 mm.

The second focusing electrode 9 and the sweep electrode 6 are arranged in this order along the Z-axis direction between the aperture electrode 5 and the phosphor screen 8. The sweep electrode 6 has such a configuration that two flat plate electrodes (deflection plates) are arranged so as to face each other, along the direction perpendicular to the X-axis on both sides of the tube axis of the container 2. The sweep electrode 6 is an electrode for sweeping the electron beam having passed through the aperture electrode 5, in the X-axis direction with application of sweep voltages to the two deflection plates. The second focusing electrode 9 is an electrode for forming a one-dimensional electron lens for focusing the electron beam having passed through the aperture electrode 5, in the X-axis direction on the phosphor screen 8.

Figure 2:
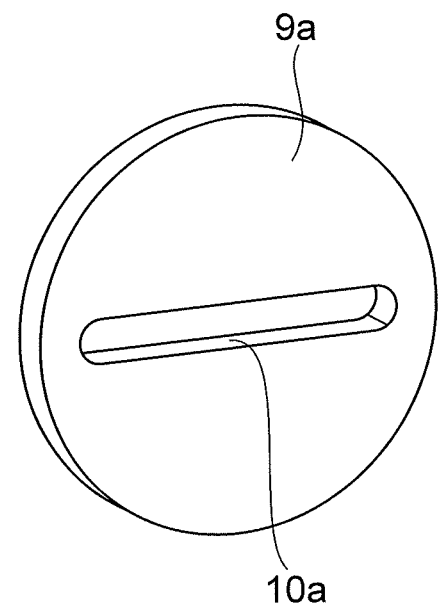
FIG. 2 is a perspective view showing a shape of a disk-shaped electrode 9a forming a second focusing electrode in FIG. 1.

The second focusing electrode 9 has such a configuration that three circular disk-shaped electrodes 9a, 9b, and 9c are arranged as spatially separated in order in the Z-axis direction (or in the tube-axis direction of the container 2) while extending along the output plate 2b. FIG. 2 is a perspective view showing the shape of the disk-shaped electrode 9a, and the disk-shaped electrode 9a has such a shape that a linear penetrating groove (slit or gap) 10a is formed along the Y-axis direction (the direction perpendicular to the sweep direction) in the disk-shaped electrode 9a. The disk-shaped electrodes 9b, 9c also have the shape similar to the disk-shaped electrode 9a. The disk-shaped electrodes 9a, 9b, and 9c are arranged so that the central part of the groove is located on the tube axis of the container 2. The ratio of the length in the Y-axis direction to the width in the X-axis direction of the grooves of the disk-shaped electrodes 9a, 9b, and 9c is preferably three or more in terms of efficiently forming the one-dimensional electron lens. When the ratio of the grooves is three or more, it is feasible to prevent potentials at the two ends in the length direction of the grooves from causing such influence as to induce electron lens action in the Y-axis direction. For example, specific sizes of the disk-shaped electrodes 9a, 9b, and 9c are set as follows: the thickness 3 mm; the width of the groove 4 mm; the length of the groove 24 mm; the spacing of the disk-shaped electrodes 9a, 9b, and 9c 3 mm. The opening of the groove 10a in the disk-shaped electrode 9a may be formed in an arcuate shape or in a linear shape at the two ends in the Y-axis direction.

Here, the two disk-shaped electrodes 9a, 9c of the second focusing electrode 9 are electrically connected to each other in the container 2 and electrically connected to the aperture electrode 5 constituting a part of the electron lens system. The disk-shaped electrode 9b between the disk-shaped electrodes 9a, 9c of the second focusing electrode 9 is configured so that any potential can be applied thereto from the outside.

Figure 3:
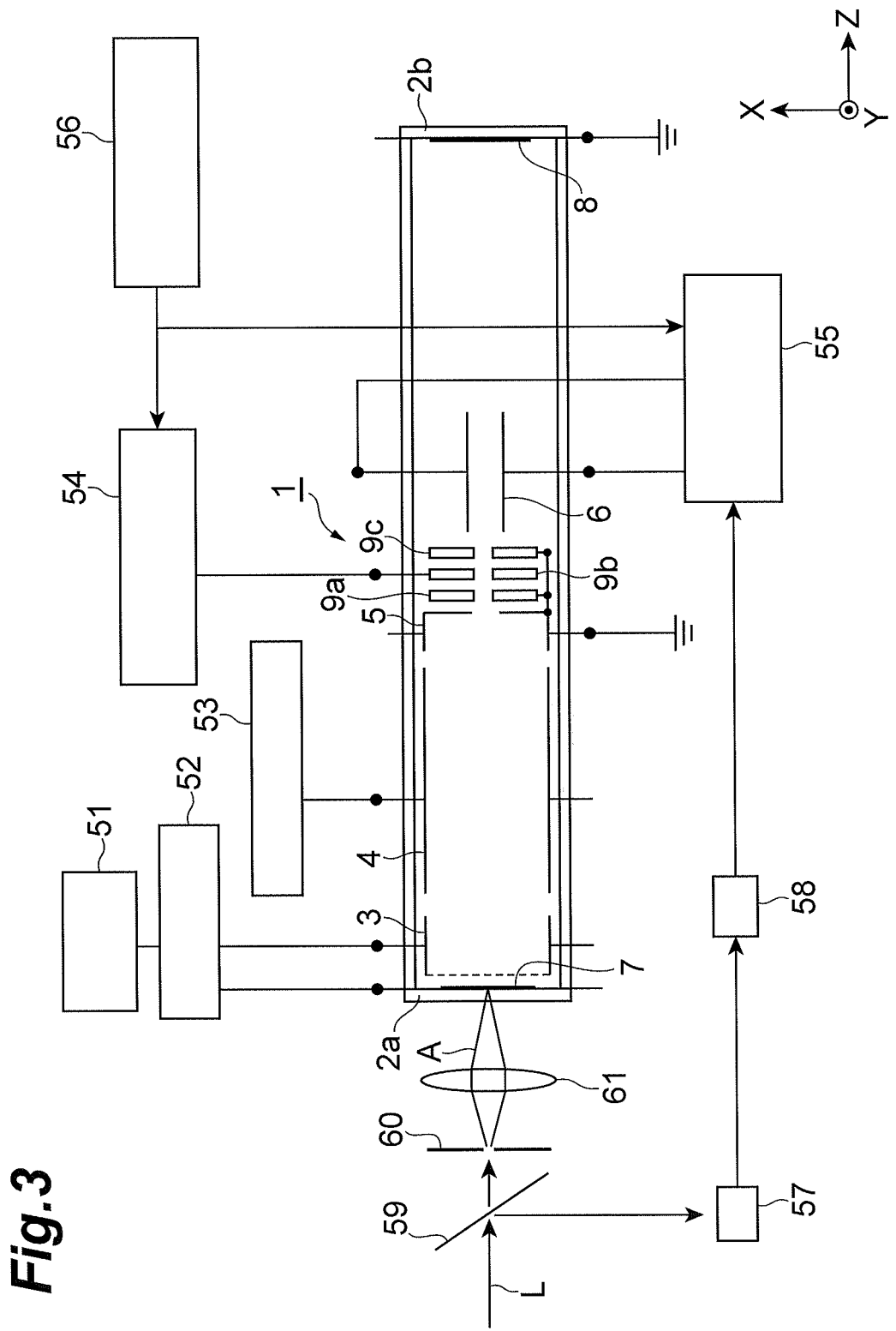
FIG. 3 is a block diagram showing a streak device including the streak tube 1 in FIG. 1 and a drive device.

FIG. 3 is a block diagram showing a streak device including the aforementioned streak tube 1 and a drive device for the same. The ground potential is applied to the aperture electrode 5 and the phosphor screen 8 to set them at 0 V. By this setting, the potential of the disk-shaped electrodes 9a, 9c of the second focusing electrode 9 is set at 0V. At the same time as it, a voltage generated by a high-voltage power supply 51 is divided by a voltage dividing circuit 52. By this, −3 kV is applied to the photocathode 7 and +3 kV to the mesh electrode 3. A voltage supply 53 for the first focusing electrode is connected to the first focusing electrode 4 and the voltage supply 53 for the first focusing electrode applies a high voltage of positive polarity to the first focusing electrode 4. A voltage supply 54 for the second focusing electrode is connected to the disk-shaped electrode 9b of the second focusing electrode 9 and the voltage supply 54 for the second focusing electrode applies a preset voltage to the disk-shaped electrode 9b. The voltages output from the voltage supply 53 for the first focusing electrode and the voltage supply 54 for the second focusing electrode are adjustable.

A sweep voltage generation unit 55 is connected to the two deflection plates of the sweep electrode 6. The sweep voltage generation unit 55 supplies slant sweep voltages $Vd1(t)$, $Vd2(t)$ of opposite polarities (push-pull voltages) to the two deflection plates, respectively. These slant sweep voltages $Vd1(t)$, $Vd2(t)$ are voltages linearly varying with time, and are set to be voltages of opposite polarities to each other. The sweep voltage generation unit 55 is configured so that the slopes (temporal change rates) of the sweep voltages against time can be changed to desired values by a changeover switch. This allows the sweep speed of the electron beam on the phosphor screen 8 to be changed, for example, to 0 (no sweep), $1\times10^5$ m/s, $1\times10^6$ m/s, $5\times10^7$ m/s, and $1.4\times10^8$ m/s.

A set signal generation unit 56 is connected to the voltage supply 54 for the second focusing electrode and the sweep voltage generation unit 55. The voltage value output from the voltage supply 54 for the second focusing electrode, the slopes of the sweep voltages generated by the sweep voltage generation unit 55, etc. are changeable by signals from the set signal generation unit 56. The set signal generation unit 56 sets the voltage value applied to the disk-shaped electrode 9b of the second focusing electrode 9, in synchronism with the setting of the slopes of the sweep voltages. The set signal generation unit 56 outputs set values indicative of the slopes and the voltage value to the voltage supply 54 for the second focusing electrode and to the sweep voltage generation unit 55, respectively.

This drive device is further provided with a PIN photodiode 57 to detect incidence of light to be measured, to generate a trigger signal, and a delay circuit 58 to delay the trigger signal and output the delayed signal to the sweep voltage generation unit 55. The sweep voltage generation unit 55 applies the slant sweep voltages $Vd1(t)$, $Vd2(t)$ in accordance with the generation timing of the trigger signal. The PIN photodiode 57 and delay circuit 58 permit the sweep voltages to be applied in time with the timing when the electron beam generated according to incidence of the light to be measured passes through the sweep electrode 6.

An operation method of the streak tube 1 having the above-described configuration, and the drive device for it, and operations of those will be described with reference to FIG. 3.

First, while the ground potential (0 V) is applied to the two deflection plates of the sweep electrode 6 and the disk-shaped electrode 9b of the second focusing electrode 9, the light L to be measured is guided via a half mirror 59, a slit plate 60, and an optical lens 61 to be focused on the entrance plate 2a, whereby a linear optical image A along the Y-axis direction is made incident on the photocathode 7. At this time, the output potential of the voltage supply 53 for the first focusing electrode is adjusted to a predetermined potential, e.g., +6.8 kV or the like, whereby a still linear optical image can be obtained in focus on the phosphor screen 8. On this occasion, since the electron lens formed by the first focusing electrode 4 is an axially symmetric electron lens, the electron beam is focused so as to be in focus both in the direction (the sweep direction, the X-axis direction) perpendicular to the line direction of the linear optical image and in the line direction (the spatial direction, the Y-axis direction).

Next, when the sweep voltage generation unit 55 generates the sweep voltages to sweep the electron beam at the sweep speed of $1\times10^5$ m/s on the phosphor screen 8, we obtain a luminance distribution (streak images) corresponding to a temporal change of intensity of the linear optical image A on the phosphor screen 8. In this case, there appears little blur of the electron beam due to the sweeping on the phosphor screen 8 because the sweep speed is relatively low; therefore, a good time resolution is achieved. The multi-channel measurement is also implemented in a good resolution in the spatial direction perpendicular to the sweep direction, without significant problem.

In the next place, the sweep voltage waveforms by the sweep voltage generation unit 55 are changed to set the sweep speed to $5\times10^7$ m/s, whereby the electron beam blurs in the sweep direction on the phosphor screen 8, failing to achieve a good time resolution. Then, the output voltage of the voltage supply 54 for the second focusing electrode is adjusted to −350 V or the like and the voltage is applied to the disk-shaped electrode 9b of the second focusing electrode 9, achieving the result of improvement in time resolution and acquisition of the maximum value of 1.5 ps. On the other hand, since the electron lens formed by the second focusing electrode 9 is the one-dimensional electron lens having the focusing action only in the sweep direction but having no action in the spatial direction, there is no change in resolution in the spatial direction perpendicular to the sweep direction, while maintaining good characteristics. Since the magnification ratio in the spatial direction is not changed, either, there is no variation in positions of respective channels in multi-channel measurement.

Furthermore, when the sweep voltage waveforms by the sweep voltage generation unit 55 are changed to raise the sweep speed to $1.4 \times 10^8$ m/s, the blur of the electron beam becomes much larger in the sweep direction on the phosphor screen 8. Then, the output voltage of the voltage supply 54 for the second focusing electrode is adjusted to −500 V or the like to enhance the power of the one-dimensional electron lens, achieving improvement in time resolution and acquisition of the maximum value of 0.9 ps. At this time the characteristics in the spatial direction perpendicular to the sweep direction are unchanged so as to be kept good.

In this manner, the optimal applied voltage to the second focusing electrode 9 is determined corresponding to each sweep speed, and, therefore, by such operation as to change the sweep speed and the applied voltage to the second focusing electrode in synchronism by the set signal generation unit 56, streak images can be readily obtained with a high time resolution and a high spatial resolution.

The streak tube 1 according to the present embodiment described above is configured to emit the electron beam from the photocathode 7 according to the light L to be measured, converge the electron beam by the electron lens system composed of the mesh electrode 3, the first focusing electrode 4, the aperture electrode 5, and the second focusing electrode 9, and guide the electron beam to the phosphor screen 8 on the output plate 2b while being swept in the sweep direction along the output plate 2b by the sweep electrode 6. As a consequence of that, an output distribution corresponding to a temporal change of the light L to be measured is obtained along the sweep direction. In this operation, the applied voltage to the second focusing electrode 9 is adjusted in accordance with the magnitude of the sweep speed so as to reduce the blur in the sweep direction (X-axis direction) of the output distribution, thereby achieving improvement in time resolution, while maintaining a good resolution in the spatial direction (Y-axis direction) perpendicular to the sweep direction of the output distribution as well. This prevents the blur of optical images and the variation of channel positions in the channel array direction of the output distribution in the multichannel measurement and achieves implementation of high-accuracy multi-channel measurement.

Since the disk-shaped electrodes 9a, 9c of the second focusing electrode 9 are electrically connected to the aperture electrode 5, the disk-shaped electrodes 9a, 9c surely block the electric field generated by the voltage applied to the disk-shaped electrode 9b. As a consequence of that, it is feasible to more definitely prevent the adverse effect on the axially symmetric electron lens formed by the first focusing electrode 4 and the aperture electrode 5.

Furthermore, the disk-shaped electrodes 9a, 9b, and 9c of the second focusing electrode 9 have such a shape that the linear groove is formed along the spatial direction perpendicular to the sweep direction along the output plate 2b. This allows the one-dimensional electron lens in the sweep direction to be formed on a stable basis.

Next, the operational effect of the streak tube 1 of the present embodiment will be described in more detail in comparison with the conventional example shown in FIGS. 8 and 9.

Figure 8:
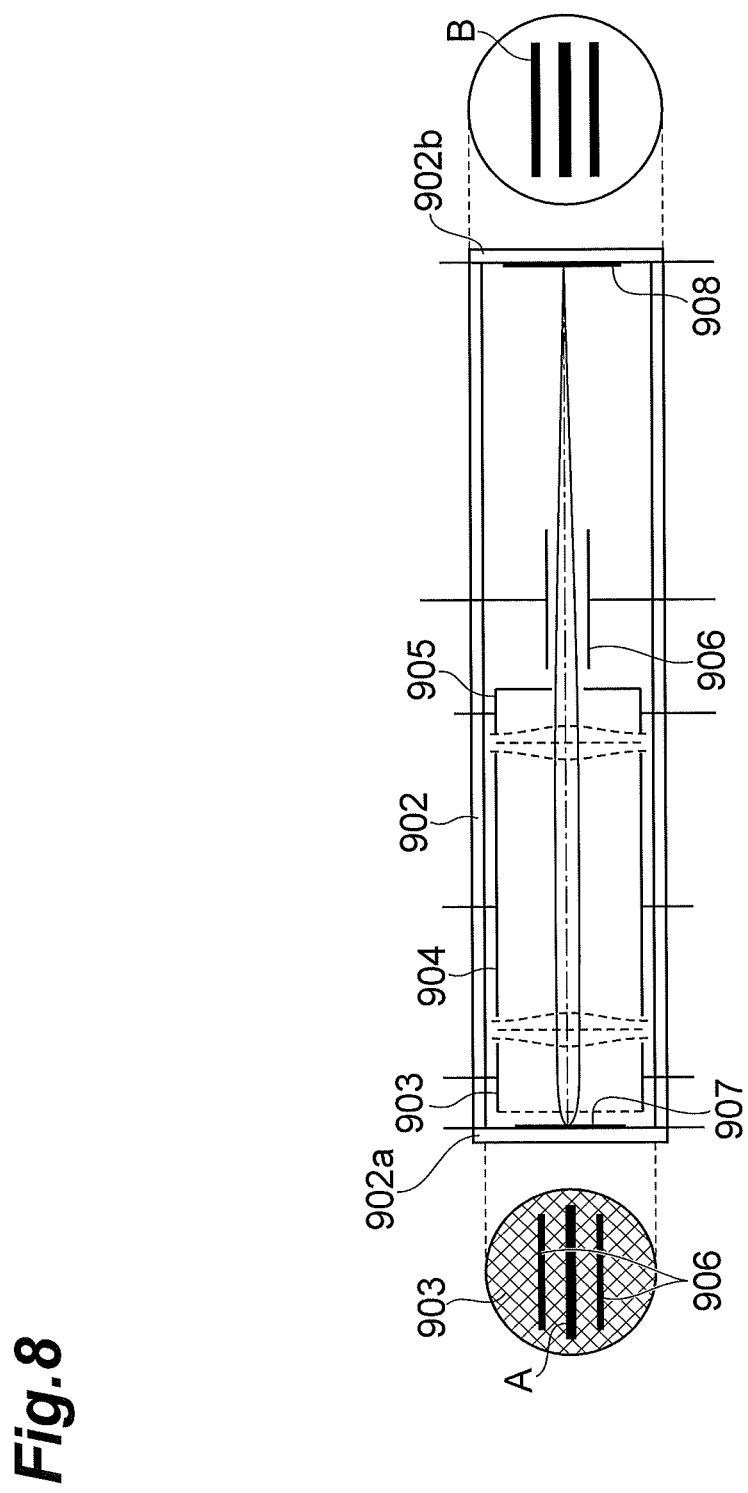
FIG. 8 is a sectional view along a plane perpendicular to the deflection plates of the sweep electrode in the conventional streak tube, including its tube axis.
Figure 9:
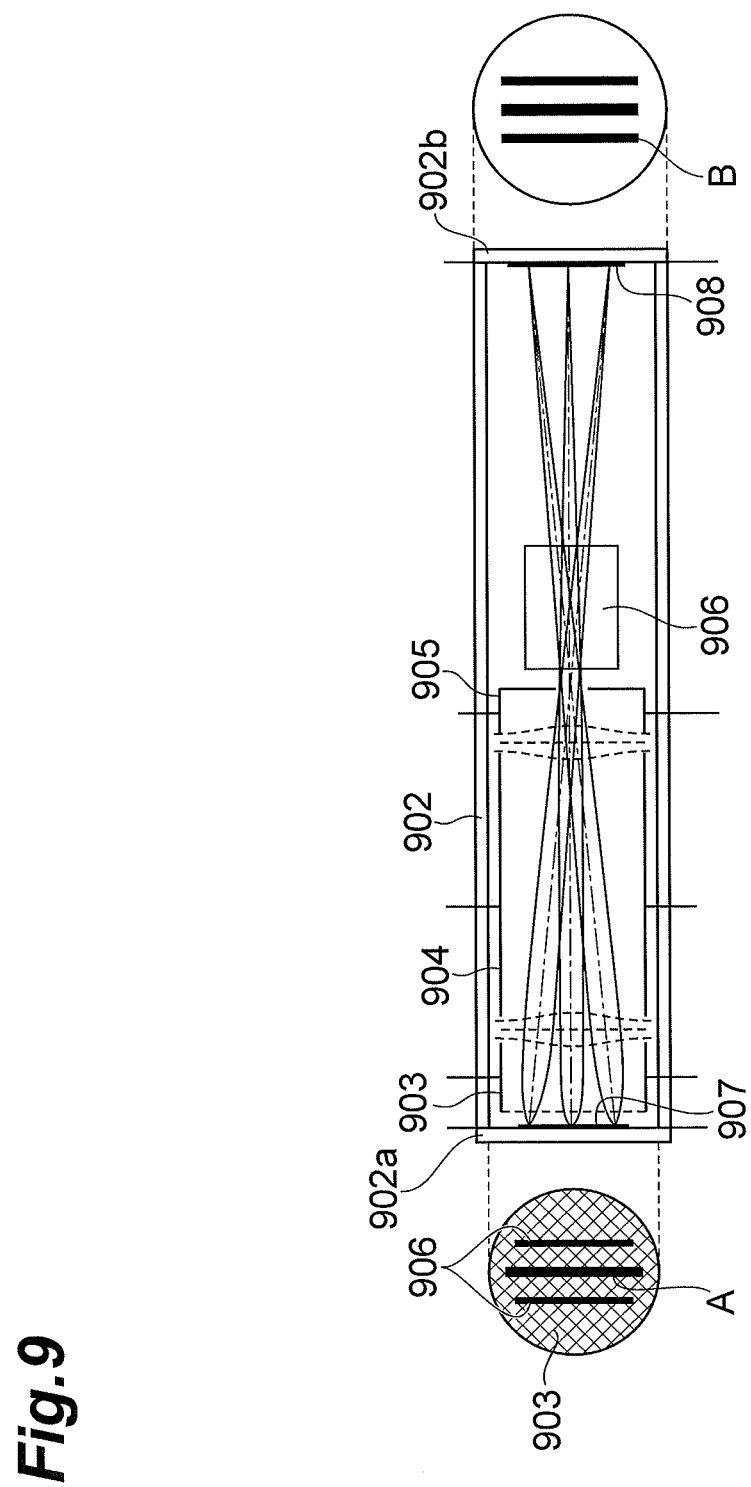
FIG. 9 is a sectional view along a plane parallel to the deflection plates of the sweep electrode in the streak tube in FIG. 8, including its tube axis.

First shown is how the time resolution of streak images is achieved in the conventional streak tube shown in FIGS. 8 and 9.

A group of photoelectrons is emitted in an initial velocity distribution corresponding to a type of photocathode 907 and a wavelength of incident light from each point of an optical image A on the photocathode 907. For example, photoelectrons emitted with visible light from the S20 photocathode have initial energy in a distribution of 0 to several eV. Emission angles θ of the photoelectrons (angles to a normal to the photocathode) are in the range of $0 < \theta \leq 90°$. When a trajectory of photoelectrons emitted at the initial velocity 0 from the photocathode 907 is defined as a primary trajectory and any trajectory other than it is defined as a secondary trajectory, there are innumerable secondary trajectories and a secondary trajectory becomes more distant from the primary trajectory with increase in the emission angle θ at a point of time of emission from the photocathode 907 and with increase in initial energy. As an example, FIGS. 8 and 9 show the primary trajectories and secondary trajectories of photoelectrons emitted from three points corresponding to the linear optical image A on the tube axis on the photocathode 907 by chain lines and solid lines, respectively, where the secondary trajectories are trajectories of photoelectrons emitted at the emission angle 60° and the initial energy 1 eV in symmetry with respect to the primary trajectory.

As shown, the secondary trajectories of photoelectrons emitted from the center of the photocathode 907 become separated away from the primary trajectory in the initial stage and thereafter bent toward the primary trajectory by the axially symmetric electron lens formed by the focusing electrode 904. For this reason, the secondary trajectories are located at the maximum distance from the primary trajectory near the aperture electrode 905 and then decrease their distance to reach the vicinity of the central point of the phosphor screen 908. Since there are innumerable secondary trajectories in fact, arrival points of the photoelectron group have some distribution and the half-value width $W_F$ of the distribution can be minimized by adjusting the voltage of the focusing electrode 904, e.g., to +7 kV. It is, however, noted that the half-value width $W_F$ can never be perfectly null because of chromatic aberration and spherical aberration of the electron lens and, for example, $W_F$ is approximately 20 μm. Since the electron lens formed by the cylindrical electrode system is axially symmetric, the secondary trajectories are focused in the same manner in both of the sweep direction and the spatial direction. Furthermore, the photoelectron groups emitted from the points other than the central point on the photocathode 907 are also focused in the same manner. As a consequence of that, a linear optical image B corresponding to the linear optical image A is formed on the phosphor screen 908. Since the electron lens is axially symmetric herein, the size of the optical image B is one obtained by isotropically magnifying the optical image A at the magnification ratio M (e.g., 3).

Here, the half-value width 1a in the direction (sweep direction) perpendicular to the line direction of the optical image A is set, for example, to about 10 μm. In this case, the half-value width 1b in the direction (sweep direction) perpendicular to the line direction of the optical image B is expressed by Expression (1) below.

$$1b \sim (1a^2 \times M^2 + W_F^2)^{1/2} \quad (1)$$

For example, when $1a=10$ μm, $M=3$, and $W_F=20$ μm, the half-value width 1b is calculated as approximately 36 μm.

At this time, where the sweep speed of the electron beam on the phosphor screen 908 is denoted by Vs, the time resolution Δt defined by the half-value width 1b of the optical image B is represented by Expression (2) below.

$$\Delta t = 1b/Vs \quad (2)$$

For example, when 1b is approximately $3.6 \times 10^{-5}$ (m) and Vs approximately $1.2 \times 10^6$ (m/s), Δt is approximately $3 \times 10^{-11}$ (s), i.e., the time resolution is 30 ps.

As seen from above Expression (2), the time resolution becomes better with increase of the sweep speed Vs. In fact, however, there occurs another beam spread W on the phosphor screen 908 due to deflection (sweep) of the electron beam and it increases with increase of the sweep speed. For this reason, there are ways and means adopted for decreasing the beam spread W.

Figure 10:
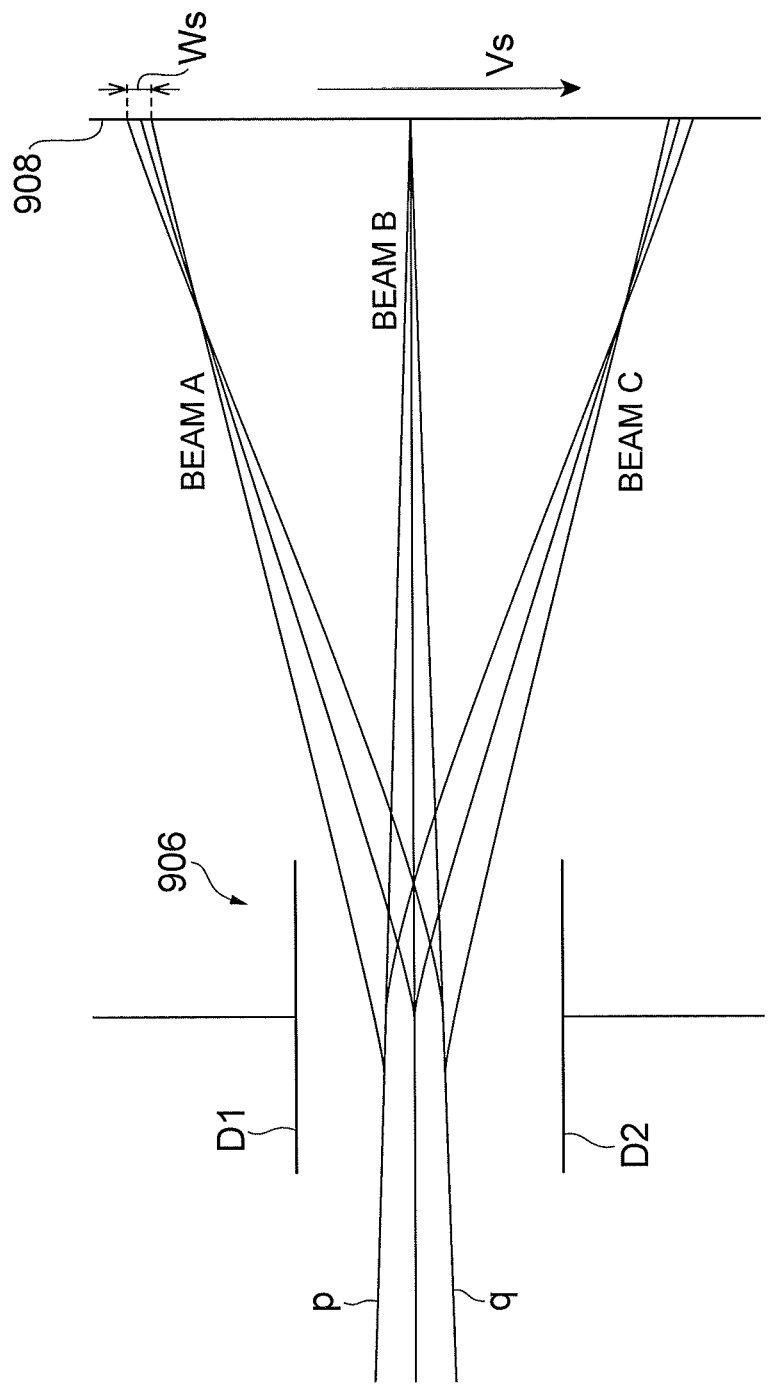
FIG. 10 is a drawing showing a spread Ws of an electron beam on a phosphor screen 908 in the case where a DC voltage is applied to the sweep electrode 906 in FIG. 8.

First, we will describe with reference to FIG. 10, the spread Ws due to deflection of the electron beam at each position on the phosphor screen 908 in situations where a DC voltage is applied to the deflection plates of the sweep electrode 906 (static case). The beam A shown in the same drawing indicates the electron beam by the primary trajectory and secondary trajectories in a situation where +VD (positive voltage) is applied to the deflection plate D1 and −VD (negative voltage) to the deflection plate D2. The beam C indicates the electron beam by the primary trajectory and secondary trajectories in a situation where −VD (negative voltage) is applied to the deflection plate D1 and +VD (positive voltage) to the deflection plate D2. The both beams are those resulting from deflection of the beam B focused at the central point on the phosphor screen 908 without application of the deflection voltage. In fact the beam B has the beam spread with the half-value width $W_F$ (~20 µm) due to the aberrations of the electron lens on the phosphor screen 908 as described above, but the half-value width $W_F$ of the beam B is illustrated as 0, in order to evaluate only the beam spread due to deflection. The beams A, C both have the spread Ws due to deflection on the phosphor screen 908. This spread is caused by a difference between deflection amounts on the phosphor screen 908 of p electrons and q electrons on the secondary trajectories shown in the drawing.

Figure 11:
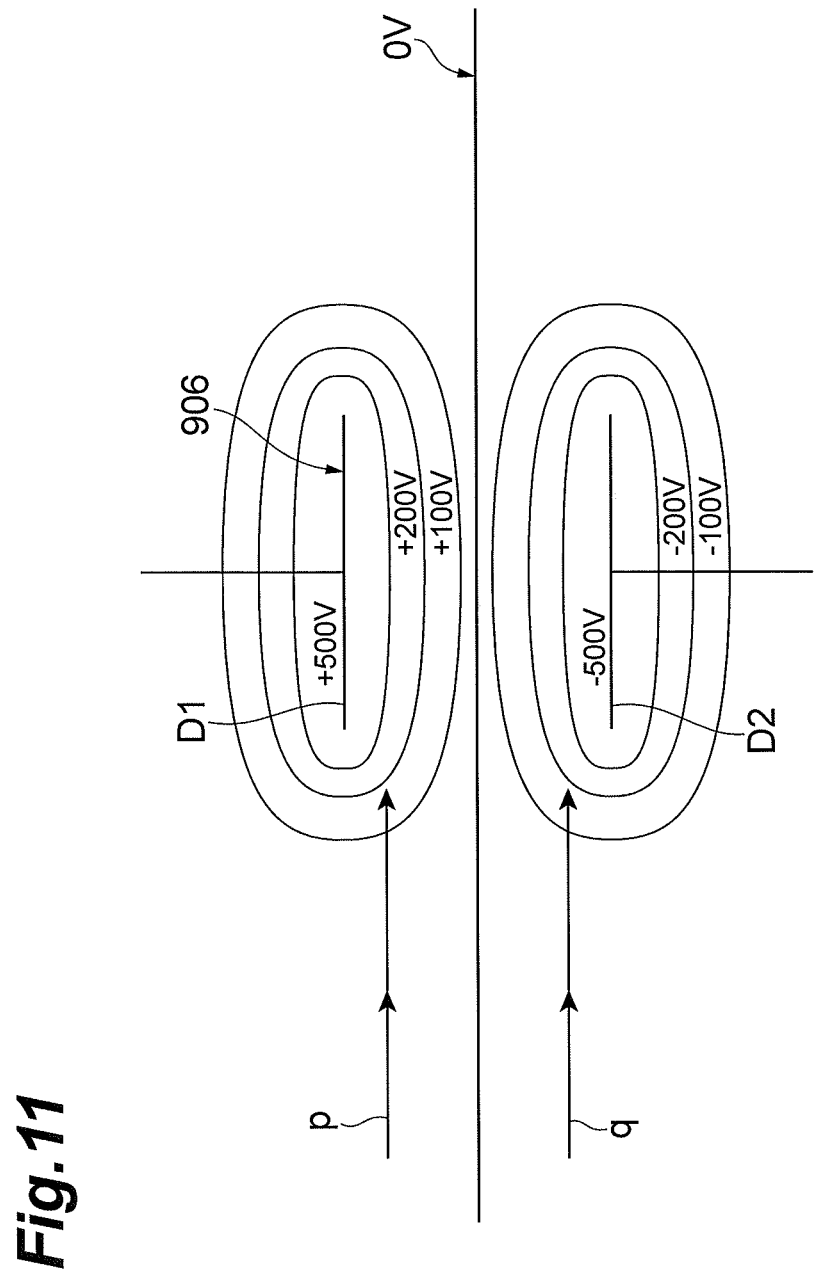
FIG. 11 is a drawing showing equipotential lines around the sweep electrode 906 in the case where the DC voltage is applied to the sweep electrode 906 in FIG. 8.

FIG. 11 shows equipotential lines around the sweep electrode 906 when the magnitude VD of the voltages applied to the deflection plates D1, D2 is 500 V. In the case of the electron beam A, p electrons incident on a region near the end of the sweep electrode 906 on the photocathode 907 side are closer to the deflection plate D1 to which the positive voltage +VD is applied, and are thus accelerated in the tube-axis direction. Since q electrons are closer to the deflection plate D2 to which the negative voltage −VD is applied, they are decelerated. As a result, the q electrons travel through the sweep electrode 906 slower than the p electrons; for this reason, the q electrons are more subject to the action of the deflection electric field and thus are more strongly deflected than the p electrons. In the case of the electron beam C, the relationship between p electrons and q electrons is reverse. In this manner, the electron beam is focused in front of the phosphor screen 908 at the edge of the phosphor screen 908, so as to yield the spread Ws. Amounts of this spread become larger at places where the electron beam is more deflected from the center. This spread is a cause of degradation of the time resolution from above Expressions (1), (2). On the other hand, the problem of degradation of time resolution in the static case becomes unproblematic by selecting a small deflection angle range as an effective sweep width.

Next, we will evaluate a spread Wd of the electron beam in situations of slant voltages used in streak operation in which the voltages applied to the deflection plates of the sweep electrode 906 vary during passage of electrons (dynamic case).

Figure 12:
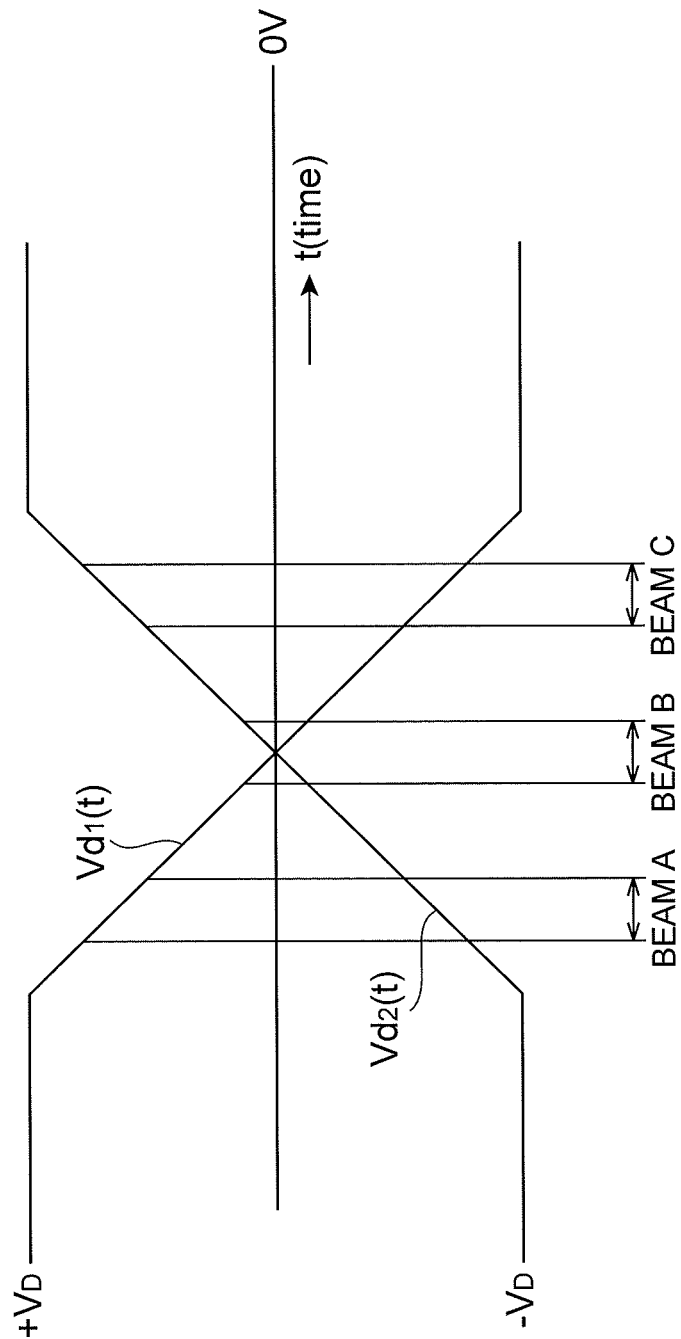
FIG. 12 is a graph showing voltage waveforms of slant sweep voltages Vd1(t), Vd2(t) applied to the sweep electrode 906 in FIG. 8.

FIG. 12 shows voltage waveforms of the slant sweep voltages $Vd1(t)$, $Vd2(t)$ applied to the sweep electrode 906. When it is assumed herein that the sweep voltage $Vd1(t)$ is applied to the deflection plate D1 and the sweep voltage $Vd2(t)$ to the deflection plate D2, the voltage between the two deflection plates D1, D2 at time t is $Vd1(t)-Vd2(t)$. As long as changing amounts of the slant voltages during passage of photoelectrons through the sweep electrode 906 are negligibly smaller than the acceleration voltage between the photocathode 907 and the aperture electrode 905, we can handle such situations in the same manner as in the aforementioned case of the DC deflection voltage being applied.

For example, supposing that photoelectrons are accelerated to about 3 keV between the photocathode 907 and the aperture electrode 905, the speed of photoelectrons in the tube-axis direction at the sweep electrode 906 is approximately $3.3\times10^7$ m/s. When the length of the sweep electrode 906 is assumed to be, for example, 35 mm, the time necessary for photoelectrons to pass through the sweep electrode 906 is approximately 1.08 ns. For example, if the slant voltages shown in FIG. 12 have a time change rate of about 2000 V change per µs, a change of the voltages applied to the deflection plates D1, D2 is approximately 1.1 V in the period of passage through the sweep electrode 906, which is extremely smaller than above 3 keV, and we can regard this case as the same as the case of the DC voltage being applied.

Figure 13:
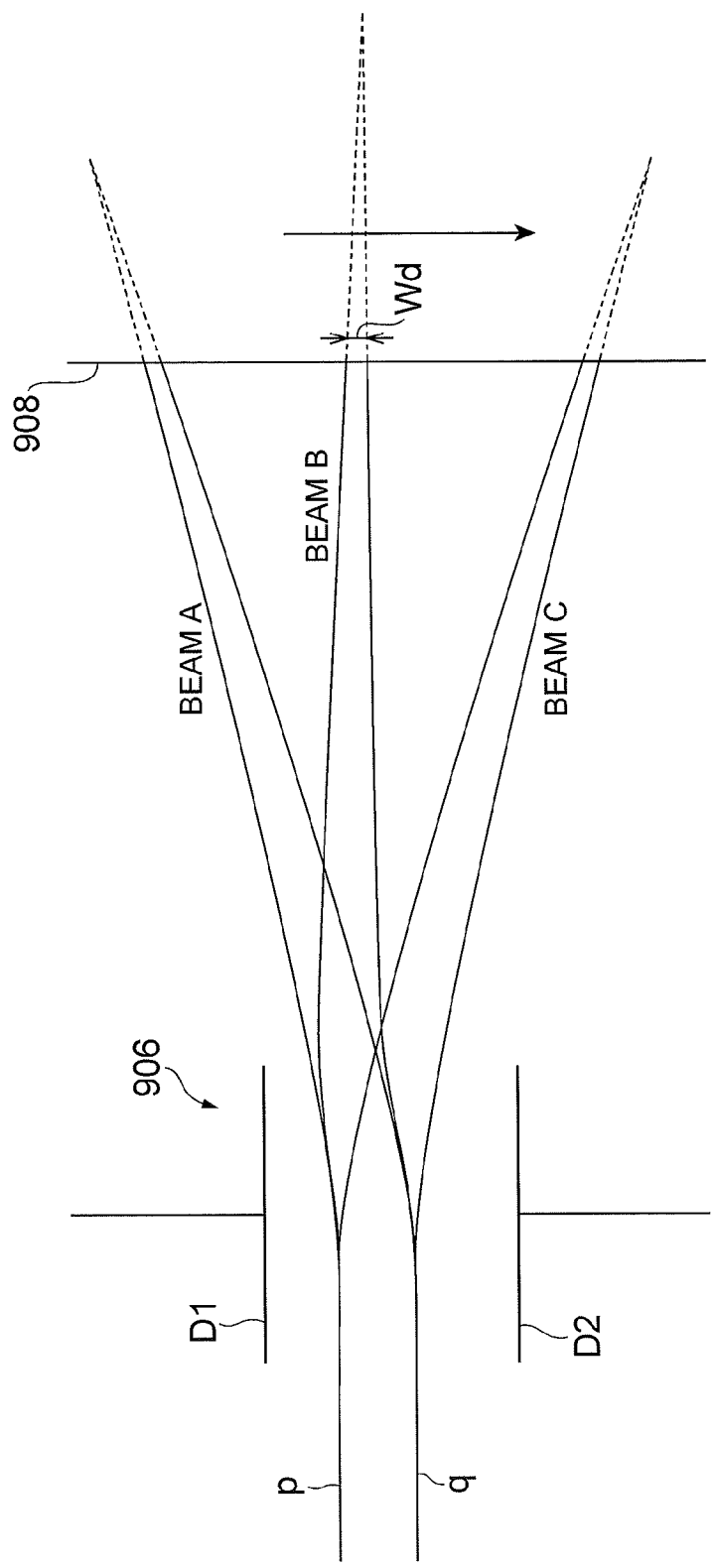
FIG. 13 is a drawing showing a spread Wd of an electron beam on the phosphor screen 908 in the case where the sweep voltages are applied to the sweep electrode 906 in FIG. 8.

In contrast to it, for example, in situations where the sweep voltages vary several hundred or more V in the passing period of photoelectrons, e.g. 1.08 ns, states of spreads of beams on the phosphor screen 908 are different. FIG. 13 shows states of beam spreads on the phosphor screen 908 in a situation where the slopes of the sweep voltages applied to the deflection plates D1, D2 are very large. In this case, the basis that electrons at lower speeds in the tube-axis direction are more subject to the action of the deflection electric field is the same as in the case of the DC deflection voltage being applied, but the deflection electric field varies with time in the duration in which the electron pulse beam passes through the deflection field. In addition, the beam spread Wd becomes maximum near the center of the phosphor screen 908 and states of occurrence of the spread at greater deflection places are also different from those in the case of the DC deflection voltage being applied. This spread is almost the same as that appearing on the surface of the phosphor screen 908 in a case where a focus point of the photoelectron beam is shifted to a plane farther than the phosphor screen 908 by adjusting the voltage of the focusing electrode 904, as indicated by dotted lines in FIG. 13. In either case, different from the case of FIG. 10, the spread Wd is the largest near the center of the phosphor screen 908 expected to be effectively used, which is problematic. It is also known in general that in measurement with the use of the streak tube the beam spread Wd becomes larger with increase of the sweep speed to achieve a high time resolution.

With occurrence of the spread Wd, as described above, the half-value width $1b$ in the direction (sweep direction) perpendicular to the line direction of the optical image B is approximated by Expression (3) below, which is worse than the time resolution calculated by above Expression (2).

$$1b \sim (1a^2 \times M^2 + W_F^2 + Wd^2)^{1/2} \qquad (3)$$

Figure 14:
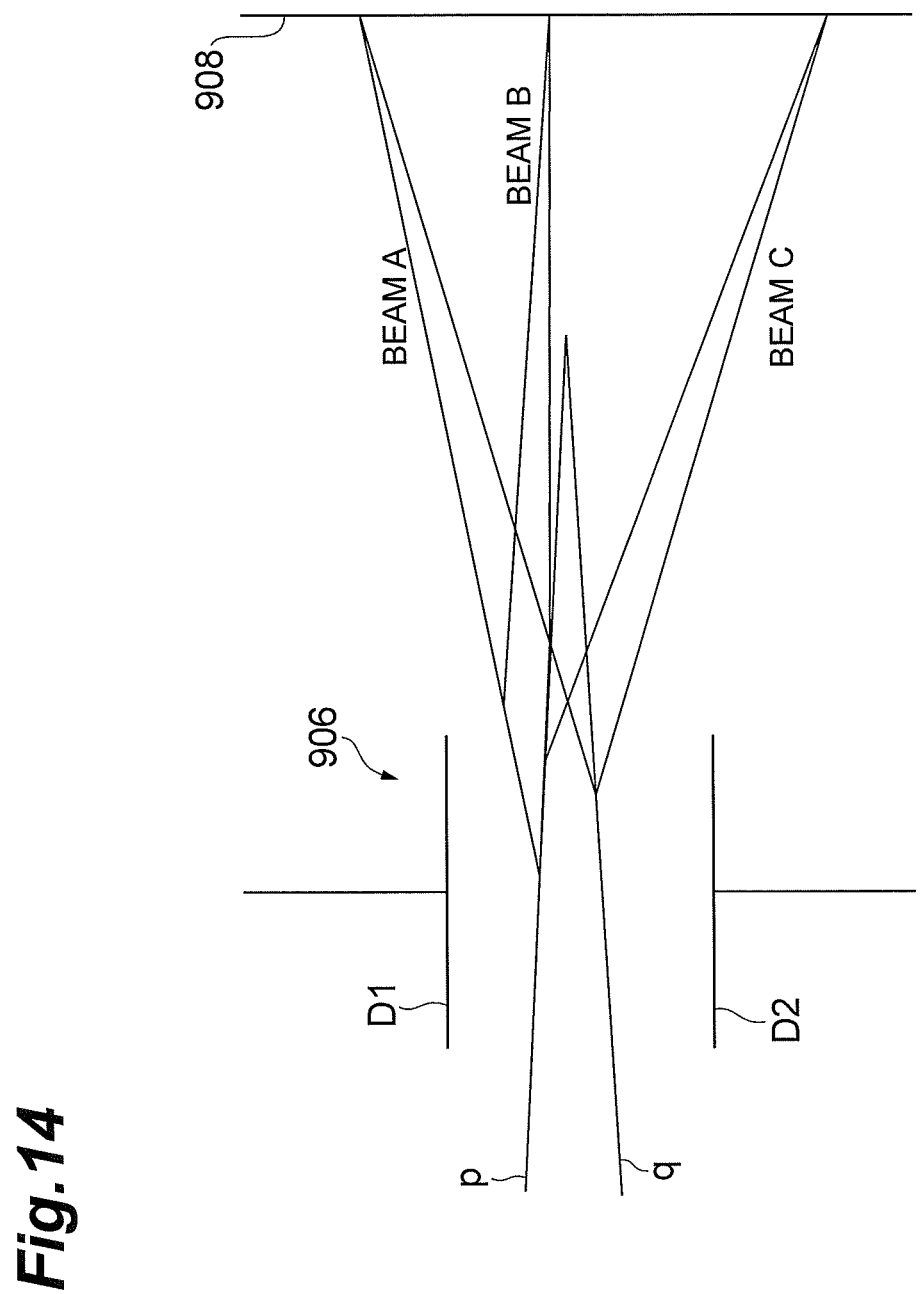
FIG. 14 is a drawing showing focusing states of electron beams on the phosphor screen 908 in the case where the sweep voltages are applied to the sweep electrode 906 in FIG. 8.

As shown in FIG. 13, the beam spread Wd occurring in sweeping at high speed is almost equivalent to that with a backward shift of the beam focal plane to behind the phosphor screen 908. Therefore, the conventional countermeasure against the degradation of time resolution due to the spread Wd was, as shown in FIG. 14, to adjust the voltage of the focusing electrode 904 to enhance the power of the axially symmetric electron lens so as to minimize the spread Wd at the center of the phosphor screen 908. In this case, if the sweep speed is low, the focal point of the electron beam will move forward so as to increase the spread Wd. The conventional means for dealing with this variation of the spread Wd depending on the sweep speed was to minimize the spread Wd at each sweep speed by changing the voltage of the focusing electrode 904 according to the sweep speed. For example, the applied voltage to the focusing electrode 904 was set at +9 kV for the sweep speed 1.4×10⁸ m/s on the phosphor screen 908, whereas the applied voltage to the focusing electrode 904 was set at +7 kV, for the sweep speed 0, i.e., for the case of a still image being output.

However, when the multi-channel measurement is carried out using the conventional streak tube, the operation of adjusting the voltage of the focusing electrode 904 to the optimum value according to the sweep speed as described above in order to reduce the spread Wd in the sweep direction in high-speed sweeping has a problem of degradation of accuracy of information in the spatial direction. This will be described below.

Figure 15:
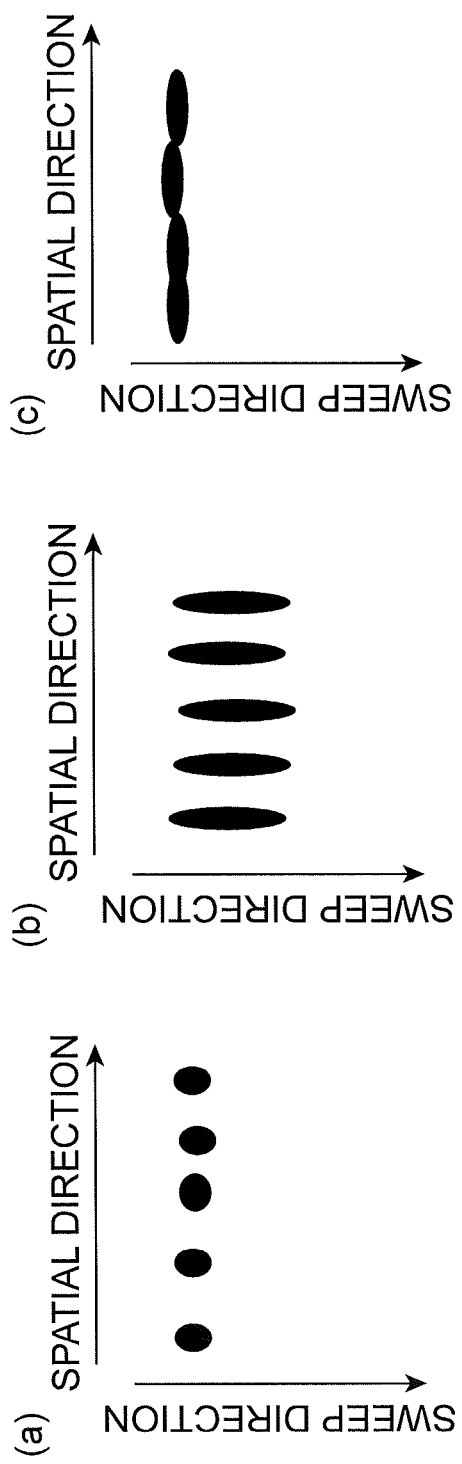
FIG. 15 is a drawing showing images of streak images output from the phosphor screen 908 in FIG. 8.

It is assumed for simplicity that all beams of incident pulsed light of multiple channels are incident at an identical time and that their pulse widths are as small as negligible. We suppose herein that without sweeping (in the static case), the voltage of the focusing electrode 904 for just focusing electron beams on the phosphor screen 908 is $V_{F0}$ (e.g., +7 kV). In this case, there occurs no beam spread Wd at low sweep speeds. At this time, the electron beams are just focused both in the sweep direction and in the spatial direction perpendicular thereto by the axially symmetric electron lens made at the applied voltage $V_{F0}$ to the focusing electrode 904. Therefore, as shown in FIG. 15(a), the multi-channel time-resolved measurement is implemented in a good time resolution and also in a good spatial resolution (half-value width $W_F$) in the spatial direction perpendicular to sweeping. However, as the sweep speed becomes higher, the beam spread Wd occurs in the sweep direction on the phosphor screen 908 as far as the voltage of the focusing electrode 904 is kept at $V_{F0}$. This causes degradation of the time resolution, while the spatial resolution is maintained as shown in FIG. 15(b). On the other hand, a high time resolution can be achieved by changing the voltage of the focusing electrode 904 to $V_{F1}$ so as to almost nullify the beam spread in the sweep direction as described above. In the spatial direction, however, the electron beams are focused in front of the phosphor screen 908 because of the axially symmetric electron lens and therefore the optical images are significantly blurred on the phosphor screen 908 as shown in FIG. 15(c), with the result that signals of adjacent channels are mixed to degrade accuracy.

Since the change of the voltage of the focusing electrode 904 leads to a change of the power of the axially symmetric electron lens, the magnification ratio of the lens also changes, so as to result in variation of the positions of the respective channels in the spatial direction on the phosphor screen 908. Since the voltage $V_{F1}$ of the focusing electrode 904 is changed to the optimum value according to the sweep speed, the positions of the respective channels vary on the phosphor screen 908 at every time of change, which makes processing of data very hard in the multi-channel measurement.

In contrast to it, the streak tube 1 and its drive device of the present embodiment are equipped with the second focusing electrode 9 forming the one-dimensional electron lens in the sweep direction. Therefore, only the beam spread in the sweep direction can be reduced according to the sweep speed, without any effect on the resolution in the spatial direction perpendicular to the sweep direction. As a result, both the time resolution and the spatial resolution can be kept satisfactory in the multi-channel measurement. Furthermore, there is no variation in positions of the respective channels in the multi-channel measurement.

It is noted that the present invention is by no means limited to the above-described embodiment.

Figure 4:
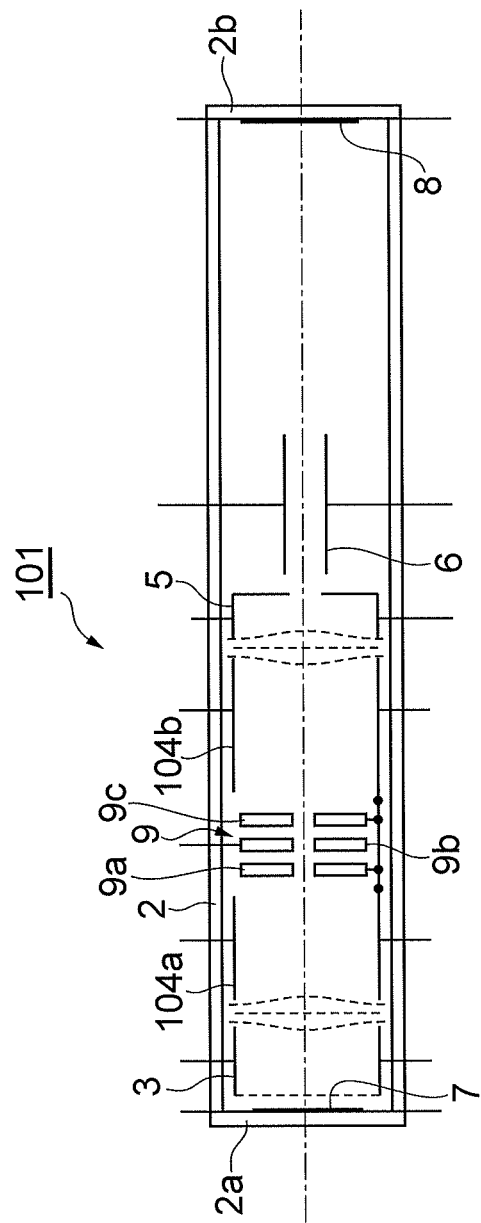
FIG. 4 is a sectional view along a plane perpendicular to the deflection plates of the sweep electrode in a streak tube 101 according to a modification example of the present invention, including its tube axis.

For example, the position of the second focusing electrode 9 may be changed as in the streak tube 101 according to a modification example of the present invention, which is shown in FIG. 4. Namely, as shown in FIG. 4, the first focusing electrode is divided into two cylindrical electrodes 104a, 104b and the second focusing electrode 9 may be arranged as spatially separated from the cylindrical electrodes 104a, 104b between those cylindrical electrodes 104a, 104b. In this streak tube 101, the cylindrical electrodes 9a, 9c of the second focusing electrode are electrically connected to each other in the container 2 and are also connected to the cylindrical electrodes 104a, 104b. The second focusing electrode 9 is separated from the axially symmetric electron lenses formed between the cylindrical electrode 104a and the mesh electrode 3 and between the cylindrical electrode 104b and the aperture electrode 5 and, the cylindrical electrodes 9a, 9c are made equipotential to the first focusing electrodes 104a, 104b. For this reason, the focusing electric field generated by the second focusing electrode 9 is almost entirely blocked and little spreads into the first focusing electrodes 104a, 104b on both sides. As a result, the influence on the axially symmetric electron lenses can be reduced even if the voltage different from that of the first focusing electrodes 104a, 104b is applied to the second focusing electrode 9.

For operating this streak tube 101, the linear optical image A is guided onto the photocathode 7 in a state in which the ground potential (0 V) is applied to the two deflection plates of the sweep electrode 6 and the same potential as that of the first focusing electrodes 104a, 104b is applied to the disk-shaped electrode 9b of the second focusing electrode. At this time, the potential of the first focusing electrodes 104a, 104b is adjusted to a predetermined potential, for example +6.5 kV or the like, whereby the linear optical image in a still state can be obtained in focus on the phosphor screen 8. On this occasion, the electron lens formed by the first focusing electrodes 104a, 104b is an axially symmetric electron lens. For this reason, the electron beam is focused so as to be in focus both in the sweep direction and in the spatial direction.

Next, when the sweep voltage is applied to the sweep electrode 6 to sweep the electron beam at 5×10⁷ m/s, the electron beam is blurred in the sweep direction on the phosphor screen 8, so as to fail to achieve a good time resolution. Then, the potential of the disk-shaped electrode 9b is adjusted to +6.2 kV, which is 300 V lower than that of the first focusing electrodes 104a, 104b, whereby the time resolution is improved, achieving the highest value of 1.5 ps. On the other hand, the electron lens formed by the second focusing electrode 9 is the one-dimensional electron lens having the focusing action only in the sweep direction but having no action in the spatial direction, so as to cause no change in resolution in the spatial direction perpendicular to the sweep direction, maintaining good characteristics. Furthermore, since there is no change in the magnification ratio in the spatial direction, there is no variation in positions of the respective channels in the multi-channel measurement, either.

Figure 5:
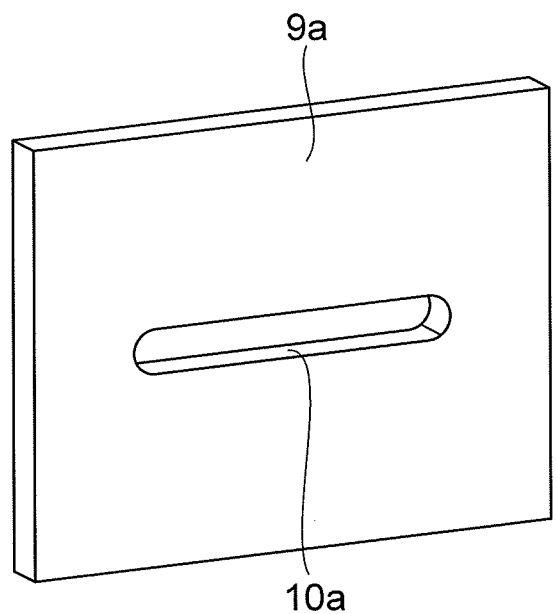
FIG. 5 is a perspective view showing a shape of the second focusing electrode according to a modification example of the present invention.

The shape of the second focusing electrodes 9a, 9b, 9c built in the above-described streak tubes 1, 101 does not have to be limited to the circular disk shape but may be a rectangular flat plate shape as shown in FIG. 5 or may adopt one of other various shapes. Furthermore, the dimensions of the second focusing electrodes 9a, 9b, 9c can be changed to various values. For example, the thickness may be set to 0.3 mm or 5 mm and the sizes of the three electrodes 9a, 9b, and 9c may be different. In this case, however, the voltage set for the second focusing electrode 9 is different, but it can be set to the optimum value by the aforementioned operation.

Figure 6:
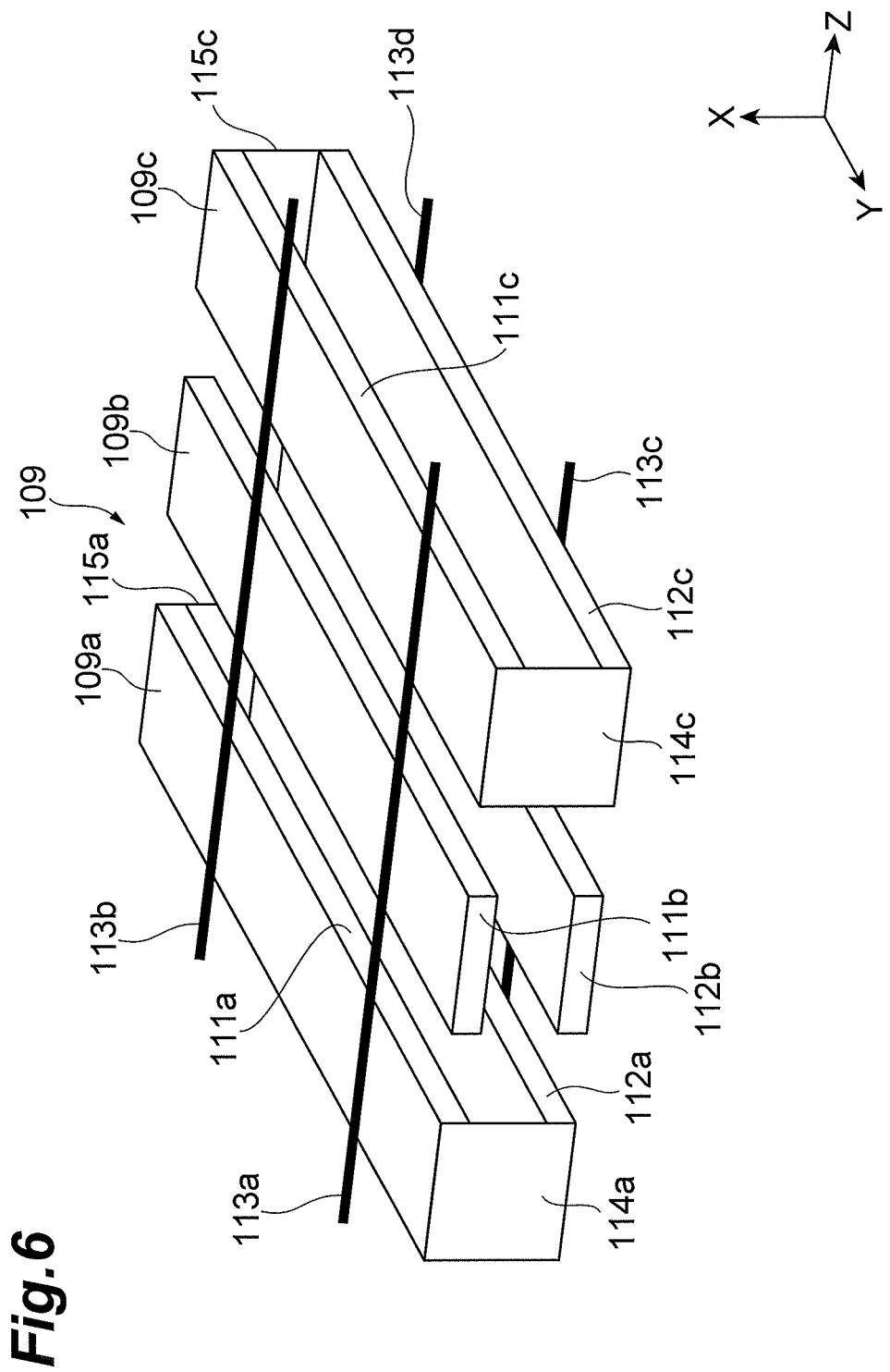
FIG. 6 is a perspective view showing a configuration of the second focusing electrode according to another modification example of the present invention.

The configuration of the second focusing electrode built in the above-described streak tubes 1, 101 may be the configuration as shown in FIG. 6. Namely, the second focusing electrode 109 shown in the same drawing has such a configuration that three parallel flat plate electrodes 109a, 109b, and 109c are arrayed along the tube-axis direction of the container 2. The parallel flat plate electrode 109a is composed of two long flat platelike electrodes 111a, 112a arranged opposite to each other along the YZ plane (a plane perpendicular to the sweep direction) in a state in which the longitudinal direction thereof is set along the Y-axis direction (spatial direction). Similarly, the parallel flat plate electrodes 109b, 109c are composed of two long flat platelike electrodes 111b, 112b and flat platelike electrodes 111c, 112c, respectively, arranged opposite to each other. The size of each of the flat platelike electrodes 111a, 112a, 111b, 112b, 111c, and 112c is, for example, the width 3.5 mm and the length 30 mm. These parallel flat plate electrodes 109a, 109b, 109c are supported with the spacing of 2 mm between them by insulating rod members 113a to 113d. Furthermore, the parallel flat plate electrodes 109a, 109c are configured so that side face plates 114a, 115a, 114c, 115c are welded to their two ends in the Y-axis direction with the spacing of 5 mm between the two flat platelike electrodes on both sides of the tube axis. Furthermore, the parallel flat plate electrodes 109a, 109c are electrically connected to each other in the container 2. With the second focusing electrode 109 of this configuration, the one-dimensional electron lens in the sweep direction can also be formed in the container 2 by the gaps formed along the spatial direction between the two flat platelike electrodes.

Figure 7:
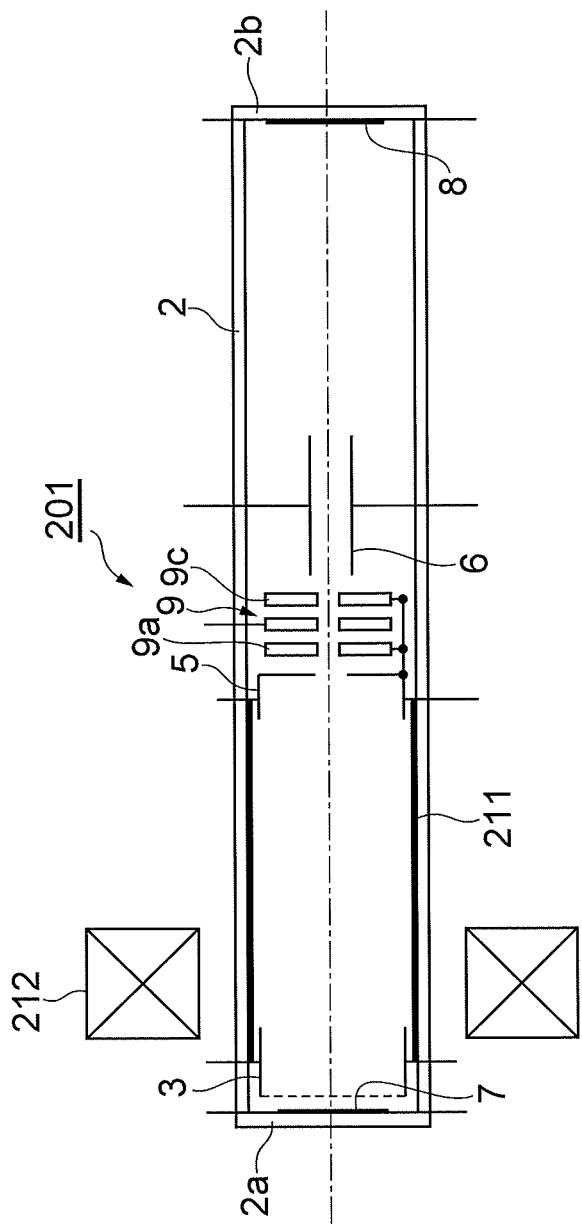
FIG. 7 is a sectional view along a plane perpendicular to the deflection plates of the sweep electrode of a streak tube 201 according to a modification example of the present invention, including its tube axis.

Like the streak tube 201 according to another modification example of the present invention shown in FIG. 7, the axially symmetric electron lens may be an electromagnetic electron lens, instead of the electrostatic electron lens. More specifically, the streak tube 201 is provided with a wall electrode 211 formed on the inner wall of the container 2 between the mesh electrode 3 and the aperture electrode 5 and an electromagnetic focusing coil 212 arranged with a central axis thereof coincident with the tube axis of the container 2 and disposed so as to surround the container 2 from the outside between the mesh electrode 3 and the aperture electrode 5, in place of the first focusing electrode 4. For operating this streak tube 201, the wall electrode 211 electrically connected to the mesh electrode 3 and the aperture electrode 5 is set at the ground potential and an electric current is allowed to flow through the electromagnetic focusing coil 212, thereby to form the axially symmetric electron lens. This lens can focus and form an image of the linear optical image incident on the photocathode 7, on the phosphor screen 8. In this case, since the space in the container 2 between the mesh electrode 3 and the aperture electrode 5 is set as an equipotential space by the wall electrode 211, there is no electrostatic electron lens formed therein.

Furthermore, the present invention is also applicable to the streak tubes wherein an MCP (microchannel plate) is arranged on the front face of the phosphor screen 8, and situations making use of synchronous scan sweeping to apply high-frequency sinusoidal voltages to the sweep electrode.

INDUSTRIAL APPLICABILITY

Use applications of the present invention are the streak tubes for converting the temporal intensity distribution of the light to be measured, into the spatial intensity distribution, and the streak devices including the same, and the present invention achieves implementation of high-accuracy multichannel measurement while preventing the blur of optical images and the variation of channel positions in the channel array direction on the output window.

REFERENCE SIGNS LIST 1, 101, 201 streak tube; 2 container; 2a entrance plate; 2b output plate; 3 mesh electrode (electron focusing system); 4, 104a, 104b first focusing electrode (electron focusing system); 5 aperture electrode (electron focusing system); 6 sweep electrode; 7 photocathode; 9, 109 second focusing electrode (additional electrode); 9a, 9b, 9c disk-shaped electrodes (first to third additional electrodes); 109a, 109b, 109c parallel flat plate electrodes (first to third additional electrodes); 10a groove (gap); 212 electromagnetic focusing coil (electron focusing system).

The invention claimed is:

1. A streak tube comprising:
a container having an entrance plate and an output plate;
a photocathode disposed in the container and configured to emit electrons according to light to be measured, the light having been incident through the entrance plate;
an electron focusing system forming an axially symmetric electron lens for focusing the electrons emitted from the photocathode, toward the output plate;
a sweep electrode disposed in the container and configured to sweep the electrons focused by the electron focusing system, in a sweep direction along the output plate; and
an additional electrode disposed between the entrance plate and the output plate and forming a one-dimensional electron lens for focusing the electrons in the sweep direction.

2. The streak tube according to claim 1,
wherein the additional electrode has such a configuration that first to third additional electrodes are arranged as spatially separated in this order between the entrance plate and the output plate and wherein the first and third additional electrodes are electrically connected to each other.

3. The streak tube according to claim 2,
wherein the additional electrode is disposed between the electron focusing system and the sweep electrode and wherein the first and third additional electrodes are electrically connected to an electrode included in the electron focusing system.

4. The streak tube according to claim 1,
wherein the additional electrode has a shape with a linear gap formed along a spatial direction perpendicular to the sweep direction along the output plate.

5. The streak tube according to claim 4,
wherein the additional electrode has such a configuration that a linear groove along the spatial direction is formed in a platelike electrode along the output plate.

6. The streak tube according to claim 4,
wherein the additional electrode has such a configuration that two platelike electrodes are arranged opposite to each other along the spatial direction.

7. A streak device comprising:
the streak tube as set forth in claim 1; and
a set signal generation unit which sets a voltage value applied to the additional electrode, in synchronism with setting of a slope of a sweep voltage applied to the sweep electrode.

* * * * *